May 2, 1939. S. E. LACEY 2,156,567
TOOL BAR CONSTRUCTION
Filed Dec. 6, 1937
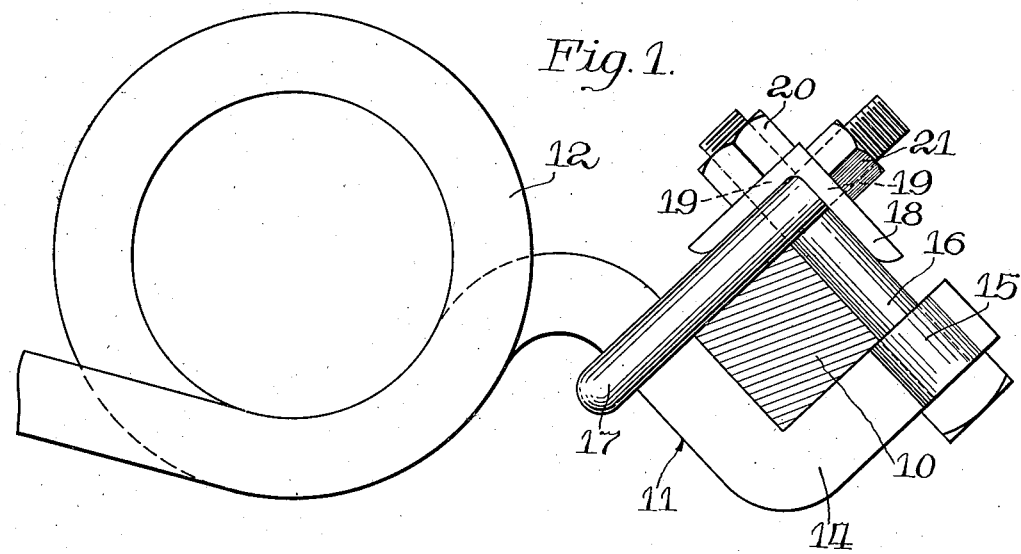
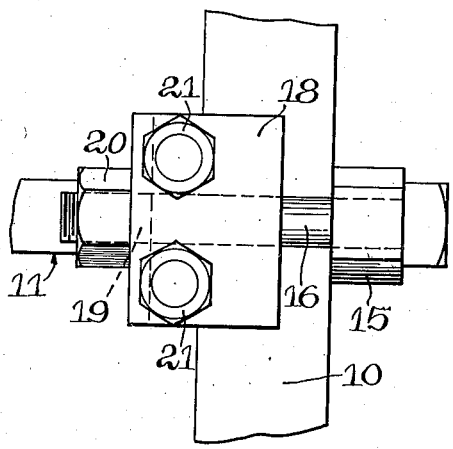
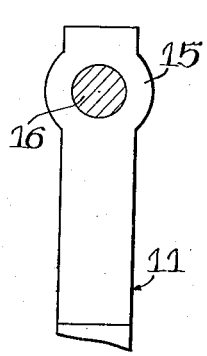
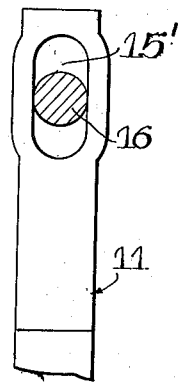
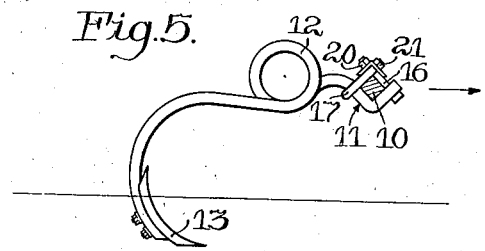
Inventor
Sumner E. Lacey
By I. F. Lussagne
Att'y.

Patented May 2, 1939

2,156,567

UNITED STATES PATENT OFFICE 2,156,567

TOOL BAR CONSTRUCTION

Sumner E. Lacey, Canton, Ill., assignor to International Harvester Company, a corporation of New Jersey Application December 6, 1937, Serial No. 178,211

14 Claims. (Cl. 55—36)

This invention relates to a tool bar construction. More specifically it relates to an improved means for clamping large size harrow teeth to a carrying bar.

In harrows or other implements, where the individual ground-working elements or teeth are of a small size, it is fairly easy to clamp the elements satisfactorily to a carrying bar. In the larger sizes, however, the elements extend quite far into the ground and there is a considerable pull on the elements. Consequently, they must be clamped very firmly to the carrying bar.

The primary object of this invention accordingly is the provision of means for clamping of harrow or ground-working elements of large size to a carrying bar.

A further object is to provide a clamping device for securing a carrying bar and ground-working elements which are subject to a heavy pull.

Another object is the provision of such an arrangement of a harrow tooth carrying bar and clamping means that the strain on the clamping means is decreased rather than increased by the pull of the ground on the harrow tooth.

According to the present invention, a harrow tooth which has an end bent to conform partially to the surface of a carrying bar is clamped to the carrying bar by means of a clamping device, which consists of a bolt extending through the very end of the tooth along one side of the carrying bar, a U-shaped bolt straddling the tooth and extending along another side of the bar, and an angle member which receives the ends of the bolts and locks the bolts and harrow tooth about the carrying bar.

In the drawing,—

Figure 1 shows in detail, by way of example, a part of a harrow tooth carrying bar and the novel means for clamping the tooth to the shaft;

Figure 2 shows a detail of the same parts taken from above as shown in Figure 1;

Figure 3 shows an end of a harrow tooth;

Figure 4 shows an end of a harrow tooth of modified form; and,

Figure 5 is a view similar to Figure 1 taken on a smaller scale and showing the relation of the harrow tooth with respect to the ground.

A carrying bar 10 has one or more harrow teeth 11 clamped to it, as shown in Figures 1 and 5. Each harrow tooth is of the spring tooth type and has a coil portion 12 at an intermediate section and a ground engaging portion 13 at its extreme end removed from a portion 14 contacting the bar. This portion is bent so that it partially surrounds or embraces the carrying bar. As shown in Figure 3, the very end of the tooth, which extends beyond the bar, is enlarged and has a slot or perforation 15.

The tooth is secured to the bar by means of novel clamping means which will now be described.

A headed bolt 16 extends through the perforation 15 and along one side of the carrying bar. A U-shaped bolt 17 straddles the tooth at the opposite side of the carrying bar and extends along the bar 10 and on either side of the bolt 16. An angle member 18, which has portions extending at right angles to one another, is perforated to receive the ends of the bolts 16 and 17, as at 19. Nuts 20 and 21 on the bolts 16 and 17 hold the angle member against the bolts and thus the tooth is clamped to the carrying bar. Ordinarily, the greatest strain on a harrow tooth during usage is imposed on the section between the coil 12 and the part which is in contact with the carrying bar. Consequently, the U-shaped bolt 17 is employed rather than a straight bolt. A hole through the tooth to receive a straight bolt would weaken the tooth dangerously at a point where the greatest stresses are set up.

The above described arrangement is of special advantage where the harrow tooth is of the heavy duty type and is subject to heavy strains and pulls. Under such conditions, the connection of the tooth and the carrying bar is also subject to great strain and consequently must be very secure and substantial.

The direction of movement of the harrow tooth through the ground is to the right, as shown by the arrow in Figure 5. Consequently, the ground engaging point of the tooth tends to move to the left, as shown in this figure, and the other end of the tooth tends to wind about the carrying bar. This action tends to relieve the strain imposed upon the bolts 16 and 17. Consequently, the bolts need not be as large as would be required with an arrangement where pull of the harrow tooth through the ground would increase the stress on the bolts rather than decrease it. Thus, the harrow tooth itself may be quite large and the bolts of a reasonable size.

It will be noted from Figure 5 that, in proceeding from one end of the harrow tooth to the other, the curve or direction of the ground engaging portion extends in an opposite direction to the bend of the portion of the tooth which engages the carrying bar. This is the reason that the pull of the ground on the harrow tooth tends to wrap the tooth around the bar rather than to unwrap it.

Figure 4 shows a modified form of harrow tooth in which the perforation in the end is an elongated slot 15' rather than a circular opening. Thus, the particular harrow tooth may be fastened to carrying bars of different sizes.

It will be apparent that changes may be made in the above construction without a departure from the spirit of the invention; for example, the carrying bar need not be of square cross-section as shown, but may be of any desired shape, such as any polygonal shape. The end of the harrow tooth will, of course, be so shaped that it embraces a portion of the carrying bar.

It will further be apparent that the tooth need not have a coiled section and that it need not be of the spring tooth form at all. It is intended to limit the invention only in terms of the appended claims.

What is claimed is:

1. In a harrow tooth construction comprising a carrying bar of rectangular section and a spring tooth comprising a body with an end portion extending therefrom in engagement with two adjacent surfaces of the bar and beyond the bar with a perforation in the part of the end portion beyond the bar, the combination with said carrying bar and spring tooth, of clamping means comprising a bolt extending through the perforation in the end of the tooth in contact with a first surface of the bar free of contact with the tooth and beyond the other free surface of the bar, a U-bolt straddling the end portion of the tooth toward the body thereof and extending in contact with the second free surface of the tooth and on both sides of the first named bolt beyond the first free surface, an angle bar having portions at right angles to one another in contact with the bolts and receiving the ends of the bolts in perforations, and nuts on the ends of the bolts holding the angle bar against the bolts.

2. In a harrow tooth construction comprising a carrying bar of rectangular section and a tooth comprising a body with an end portion extending therefrom in engagement with two adjacent surfaces of the bar and beyond the bar with a perforation in the part of the end portion beyond the bar, the combination with said carrying bar and tooth, of clamping means comprising a headed member extending through the perforation in the end of the tooth in contact with a first surface of the bar free of contact with the tooth and beyond the other free surface of the bar, a U-shaped member straddling the end portion of the tooth toward the body thereof and extending in contact with the second free surface of the bar and on both sides of the headed member beyond the first free surface, an angle bar having portions at right angles to one another in contact with the members and receiving the ends of the members in perforations, and retaining elements on the ends of the member holding the angle bar against the members.

3. In a harrow tooth construction comprising a carrying bar and a spring tooth including a body with an end portion at least partially surrounding the bar and extending beyond the bar with a perforation in the part of the end portion beyond the bar, the combination with said bar and tooth, of clamping means comprising a bolt extending through the perforation in contact with and beyond the bar, a U-bolt straddling the end portion adjacent the body of the tooth and extending in contact with the bar and on either side of the first bolt beyond the bar, an angle member having portions at substantial angles with one another in contact with the bolts and receiving the ends of the bolts in perforations, and nuts on the ends of the bolts holding the angle member against the bolts.

4. In a harrow tooth construction comprising a carrying bar of rectangular section and a spring tooth comprising a body with an end portion extending therefrom in engagement with two adjacent surfaces of the bar and beyond the bar with a perforation in the part of the end portion beyond the bar, the combination with said carrying bar and spring tooth, of clamping means comprising a first bolt extending through the perforation in the end of the tooth in contact with a first surface of the bar free of contact with the tooth and beyond the other free surface of the bar, a second bolt at least partially embracing the end portion of the tooth toward the body thereof and extending in contact with the second free surface of the tooth and beyond the first free surface and the first bolt, an angle bar having portions at right angles to one another in contact with the bolts and receiving the ends of the bolts in perforations, and nuts on the ends of the bolts holding the angle bar against the bolts.

5. In a harrow tooth construction comprising a carrying bar and a spring tooth including a body with an end portion partially surrounding the bar and extending beyond the bar with a perforation in the part of the end portion beyond the bar, the combination with said bar and tooth, of clamping means comprising a headed member extending through the perforation in contact with and beyond the bar, a second member at least partially surrounding the end portion adjacent the body of the tooth and extending in contact with the bar and beyond the bar and the first member, an angle member having portions at substantial angles with one another in contact with the members and receiving the ends of the members in perforations, and retaining elements on the ends of the members holding the angle member against the members.

6. In a harrow tooth construction comprising a carrying bar and a spring tooth including a body with an end portion partially surrounding the bar and extending beyond the bar, the combination with said bar and tooth, of clamping means comprising a first member engaging the part of the end portion beyond the bar and extending in contact with and beyond the bar, a second member at least partially surrounding the end portion adjacent the body of the tooth and extending in contact with the bar and on either side of the first member beyond the bar, an angle bar having portions at substantial angles with one another in contact with the bolts and receiving the ends of the members in perforations, and retaining elements on the ends of the members holding the angle member against the members.

7. In a harrow tooth construction comprising a carrying bar and a spring tooth including a body with an end portion partially surrounding the bar and extending beyond the bar, the combination with said bar and tooth, of clamping means comprising a first member engaging the part of the end portion of the tooth beyond the bar and extending in contact with the bar, a second member at least partially surrounding the end portion adjacent the body of the tooth and extending in contact with the bar, and a retaining member engaging the ends of the aforementioned members and holding them in contact with the carrying bar.

8. In a harrow tooth construction comprising a carrying bar and a tooth including a body with an end portion partially surrounding the bar and extending beyond the bar, the combination with said bar and tooth, of clamping means comprising a first member engaging the part of the end portion of the tooth beyond the bar and extending in contact with the bar, means straddling the end portion adjacent the body of the tooth and comprising legs extending in contact with the bar and on either side of the first member, an angle member having portions at substantial angles with one another to contact with the members and receiving the ends of the members in perforations, and retaining elements on the ends of the members holding the angle member against the members.

9. In a harrow tooth construction comprising a carrying bar and a spring tooth including means at an end thereof at least partially surrounding the bar, the combination with said carrying bar and spring tooth, of clamping means comprising a headed member extending through the perforation in the end of the tooth in contact with a first surface of the bar free of contact with the tooth and beyond the other free surface of the bar, a U-shaped member straddling the tooth extending in contact with the bar and on both sides of the means at the end of the tooth, an angle bar having portions at substantial angles to one another in contact with the U-shaped member and said means and receiving the ends of the member and means in perforations, and retaining elements on the ends of the member and means.

10. A harrow construction comprising a carrying bar, a spring tooth including a slotted end portion free of contact with the bar, a portion immediately adjacent thereto partially surrounding the bar, a body portion extending from the opposite side of the last named portion as does the end portion and having a major part thereof curved in the opposite direction as is the bend of the portion of the tooth partially surrounding the bar, and clamping means comprising a headed bolt extending through the slotted end portion of the tooth and along one side of the bar, a U-bolt straddling the tooth with its legs extending along another side of the bar and on both sides of the headed bolt, and nuts on the ends of the bolts to hold the same against the bar.

11. A harrow construction comprising a carrying bar, a spring tooth including an end portion partially surrounding the bar and a body portion extending therefrom and having a ground-engaging part extending in a direction generally opposite to the end portion, and clamping means comprising a member engaging the extremity of the end portion of the tooth and extending along one side of the bar, a U-shaped member straddling the tooth and extending along another side of the bar and on both sides of the first member, and retaining elements on the ends of the members.

12. A harrow construction comprising a carrying bar, a spring tooth including a body with an end portion partially surrounding the bar and extending beyond the bar with an elongated slot in the part of the end portion beyond the bar, and clamping means comprising a headed member extending through the perforation in contact with and beyond the bar, a second member at least partially surrounding the end portion adjacent the body of the tooth and extending beyond the bar and the first member, an angle member having portions at substantial angles with respect to one another and in contact with the members and receiving the ends of the members in perforations, and retaining elements on the ends of the members holding the angle member against the members.

13. In combination, an implement tool bar, a ground engaging tooth having an end portion formed partly to embrace the bar, and a pair of angularly related bolts for securely clamping the tooth to the bar, one bolt passing through the tooth and the other embracing a portion of the tooth.

14. In combination, an implement tool bar, a ground engaging element having an end portion formed partly to embrace the bar, and a pair of angularly related bolts for securely clamping the element to the bar, one bolt being passed through a hole in the element and the other comprising a U-bolt which embraces a portion of the element.

SUMNER E. LACEY.